US011250425B1

(12) United States Patent
Jaffe et al.

(10) Patent No.: US 11,250,425 B1
(45) Date of Patent: Feb. 15, 2022

(54) GENERATING A STATISTIC USING ELECTRONIC TRANSACTION DATA

(71) Applicant: Palantir Technologies Inc., Palo Alto, CA (US)

(72) Inventors: Aaron Jaffe, New York, NY (US); Albert Altarovici, Menlo Park, CA (US); Daniel Moulton, Brooklyn, NY (US); David Montague, East Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 584 days.

(21) Appl. No.: 15/811,460

(22) Filed: Nov. 13, 2017

Related U.S. Application Data

(60) Provisional application No. 62/428,419, filed on Nov. 30, 2016.

(51) Int. Cl.
| | | |
|---|---|---|
| *G06Q 20/38* | (2012.01) | |
| *G06Q 20/02* | (2012.01) | |
| *G06F 16/2457* | (2019.01) | |
| *G06F 16/2458* | (2019.01) | |

(52) U.S. Cl.
CPC ....... *G06Q 20/389* (2013.01); *G06F 16/2457* (2019.01); *G06F 16/2462* (2019.01); *G06Q 20/02* (2013.01)

(58) Field of Classification Search
None
See application file for complete search history.

(56) References Cited

U.S. PATENT DOCUMENTS

| | | | |
|---|---|---|---|
| 5,819,226 | A | 10/1998 | Gopinathan et al. |
| 5,892,900 | A | 4/1999 | Ginter et al. |
| 6,094,643 | A | 7/2000 | Anderson et al. |
| 6,430,305 | B1 | 8/2002 | Decker |
| 6,792,422 | B1 | 9/2004 | Stride et al. |
| 6,820,135 | B1 | 11/2004 | Dingman et al. |
| 6,978,419 | B1 | 12/2005 | Kantrowitz |

(Continued)

FOREIGN PATENT DOCUMENTS

| | | |
|---|---|---|
| CN | 102546446 A | 7/2012 |
| CN | 103167093 A | 6/2013 |

(Continued)

OTHER PUBLICATIONS

"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.

(Continued)

*Primary Examiner* — Tony Mahmoudi
*Assistant Examiner* — Umar Mian
(74) *Attorney, Agent, or Firm* — Schwegman Lundberg & Woessner, P.A.

(57) ABSTRACT

In various example embodiments, a system and method for generating a statistic using transaction data are presented. Transaction data is received, the transaction data regarding transactions performed by a set of merchants. An activity filter is generated based on the transaction data. A set of active merchants that each performs the threshold amount of transaction activity during a period of time is selected. A statistic is generated based on the transaction data.

17 Claims, 6 Drawing Sheets

(56) References Cited

U.S. PATENT DOCUMENTS

| | | |
|---|---|---|
| 6,980,984 B1 | 12/2005 | Huffman et al. |
| 7,168,039 B2 | 1/2007 | Bertram |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,046,283 B2 | 10/2011 | Burns et al. |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,473,454 B2 | 6/2013 | Evanitsky et al. |
| 8,484,115 B2 | 7/2013 | Aymeioglu et al. |
| 8,589,273 B2 | 11/2013 | Creeden et al. |
| 8,600,872 B1 | 12/2013 | Yan |
| 8,666,861 B2 | 3/2014 | Li et al. |
| 8,688,573 B1 | 4/2014 | Rukonic et al. |
| 8,744,890 B1 | 6/2014 | Bernier et al. |
| 8,798,354 B1 | 8/2014 | Bunzel et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,032,531 B1 | 5/2015 | Scorvo et al. |
| 9,100,428 B1 | 8/2015 | Visbal |
| 9,129,219 B1 | 9/2015 | Robertson et al. |
| 2001/0027424 A1 | 10/2001 | Torigoe |
| 2002/0065708 A1 | 5/2002 | Senay et al. |
| 2002/0095360 A1 | 7/2002 | Joao |
| 2002/0095658 A1 | 7/2002 | Shulman et al. |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0039686 A1* | 2/2004 | Klebanoff ............... G06Q 40/00 705/38 |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0133588 A1 | 6/2005 | Williams |
| 2005/0149455 A1 | 7/2005 | Bruesewitz et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0143034 A1 | 6/2006 | Rothermel et al. |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0061259 A1 | 3/2007 | Zoldi et al. |
| 2007/0106582 A1 | 5/2007 | Baker et al. |
| 2007/0150801 A1 | 6/2007 | Chidlovskii et al. |
| 2007/0156673 A1 | 7/2007 | Maga et al. |
| 2007/0185867 A1 | 8/2007 | Maga et al. |
| 2007/0239606 A1 | 10/2007 | Eisen |
| 2007/0284433 A1 | 12/2007 | Domenica et al. |
| 2008/0046481 A1 | 2/2008 | Gould |
| 2008/0069081 A1 | 3/2008 | Chand et al. |
| 2008/0103798 A1 | 5/2008 | Domenikos |
| 2008/0103996 A1 | 5/2008 | Forman et al. |
| 2008/0140507 A1* | 6/2008 | Hamlisch ............ G06Q 30/0202 705/7.33 |
| 2008/0140576 A1 | 6/2008 | Lewis et al. |
| 2008/0222038 A1 | 9/2008 | Eden et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0301042 A1 | 12/2008 | Patzer |
| 2008/0313132 A1 | 12/2008 | Hao et al. |
| 2009/0018996 A1 | 1/2009 | Hunt et al. |
| 2009/0076845 A1 | 3/2009 | Bellin et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0125359 A1 | 5/2009 | Knapic et al. |
| 2009/0125459 A1 | 5/2009 | Norton et al. |
| 2009/0187546 A1 | 7/2009 | Whyte |
| 2009/0187548 A1 | 7/2009 | Ji et al. |
| 2009/0228365 A1 | 9/2009 | Tomchek et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0307049 A1 | 12/2009 | Elliott, Jr. et al. |
| 2009/0313463 A1 | 12/2009 | Pang et al. |
| 2009/0319418 A1 | 12/2009 | Herz |
| 2009/0319891 A1 | 12/2009 | MacKinlay et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith |
| 2010/0070842 A1 | 3/2010 | Aymeloglu et al. |
| 2010/0094765 A1 | 4/2010 | Nandy |
| 2010/0098318 A1 | 4/2010 | Anderson |
| 2010/0114887 A1 | 5/2010 | Conway et al. |
| 2010/0131502 A1 | 5/2010 | Fordham |
| 2010/0161735 A1 | 6/2010 | Sharma |
| 2010/0169192 A1 | 7/2010 | Zoldi et al. |
| 2010/0191563 A1 | 7/2010 | Schlaifer et al. |
| 2010/0235915 A1 | 9/2010 | Memon et al. |
| 2010/0262688 A1 | 10/2010 | Hussain et al. |
| 2010/0312837 A1 | 12/2010 | Bodapati et al. |
| 2011/0004626 A1 | 1/2011 | Naeymi-rad et al. |
| 2011/0055074 A1 | 3/2011 | Chen et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0099628 A1 | 4/2011 | Lanxner et al. |
| 2011/0131122 A1 | 6/2011 | Griffin et al. |
| 2011/0153384 A1 | 6/2011 | Horne et al. |
| 2011/0173093 A1 | 7/2011 | Psota et al. |
| 2011/0178841 A1* | 7/2011 | Rane ................. G06Q 30/0202 705/7.31 |
| 2011/0178849 A1* | 7/2011 | Rane ..................... G06Q 30/02 705/7.31 |
| 2011/0208565 A1 | 8/2011 | Ross et al. |
| 2011/0213655 A1 | 9/2011 | Henkin et al. |
| 2011/0218955 A1 | 9/2011 | Tang et al. |
| 2011/0225586 A1 | 9/2011 | Bentley et al. |
| 2011/0231305 A1 | 9/2011 | Winters |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine et al. |
| 2011/0307382 A1 | 12/2011 | Siegel |
| 2011/0314007 A1 | 12/2011 | Dassa et al. |
| 2011/0314024 A1 | 12/2011 | Chang et al. |
| 2012/0011238 A1 | 1/2012 | Rathod |
| 2012/0011245 A1 | 1/2012 | Gillette et al. |
| 2012/0022945 A1 | 1/2012 | Falkenberg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0131512 A1 | 5/2012 | Takeuchi et al. |
| 2012/0158585 A1 | 6/2012 | Ganti |
| 2012/0159362 A1 | 6/2012 | Brown et al. |
| 2012/0173381 A1 | 7/2012 | Smith |
| 2012/0215717 A1* | 8/2012 | Arnott ................... G06Q 40/06 705/36 R |
| 2012/0215784 A1 | 8/2012 | King et al. |
| 2012/0221553 A1 | 8/2012 | Wittmer et al. |
| 2012/0226523 A1 | 9/2012 | Weiss et al. |
| 2012/0245976 A1 | 9/2012 | Kumar et al. |
| 2012/0278249 A1 | 11/2012 | Duggai et al. |

(56) References Cited

U.S. PATENT DOCUMENTS

| | | |
|---|---|---|
| 2012/0323888 A1 | 12/2012 | Osann, Jr. |
| 2013/0016106 A1 | 1/2013 | Yip et al. |
| 2013/0054306 A1 | 2/2013 | Bhalia et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0124263 A1* | 5/2013 | Amaro ............... G06Q 30/02 705/7.34 |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson et al. |
| 2013/0185307 A1 | 7/2013 | El-yaniv et al. |
| 2013/0226318 A1 | 8/2013 | Procyk et al. |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246178 A1* | 9/2013 | Fischer ............ G06Q 30/0222 705/14.53 |
| 2013/0246537 A1 | 9/2013 | Gaddala |
| 2013/0246597 A1 | 9/2013 | Iizawa et al. |
| 2013/0262328 A1 | 10/2013 | Federgreen |
| 2013/0263019 A1 | 10/2013 | Castellanos et al. |
| 2013/0282696 A1 | 10/2013 | John |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0325826 A1 | 12/2013 | Agarwal et al. |
| 2014/0012724 A1 | 1/2014 | O'leary et al. |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0068487 A1 | 3/2014 | Steiger et al. |
| 2014/0095363 A1 | 4/2014 | Caldwell |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0088783 A1* | 3/2015 | Mun ............... G06Q 40/06 705/36 R |
| 2015/0095773 A1 | 4/2015 | Gonsalves et al. |
| 2015/0100897 A1 | 4/2015 | Sun et al. |
| 2015/0106379 A1 | 4/2015 | Elliot et al. |
| 2015/0134512 A1 | 5/2015 | Mueller |
| 2015/0135256 A1 | 5/2015 | Hoy et al. |
| 2015/0161611 A1 | 6/2015 | Duke et al. |
| 2015/0188872 A1 | 7/2015 | White |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0148092 A1* | 5/2016 | Chauhan ............ G06F 16/9535 706/46 |
| 2016/0364727 A1* | 12/2016 | DeLawter .......... G06Q 20/4016 |
| 2017/0148025 A1* | 5/2017 | Le .................. G06Q 20/4016 |
| 2017/0193534 A1* | 7/2017 | Marshall ............ G06Q 30/0201 |

FOREIGN PATENT DOCUMENTS

| | | |
|---|---|---|
| CN | 102054015 B | 5/2014 |
| DE | 102014204827 A1 | 9/2014 |
| DE | 102014204830 A1 | 9/2014 |
| DE | 102014204834 A1 | 9/2014 |
| EP | 2487610 A2 | 8/2012 |
| EP | 2858018 A1 | 4/2015 |
| EP | 2869211 A2 | 5/2015 |
| EP | 2889814 A1 | 7/2015 |
| EP | 2892197 A1 | 7/2015 |
| EP | 2963595 A1 | 1/2016 |
| WO | WO-2005116851 A2 | 12/2005 |

OTHER PUBLICATIONS

"About OWA", Open Web Analytics, [Online]. Retrieved from the Internet: <URL: http://www.openwebanalytics.com/?page_id=2>, (Accessed: Jul. 19, 13), 5 pgs.

"An Introduction to KeyLines and Network Visualization", Keylines.com, [Online]. Retrieved from the Internet: <URL: http://keylines.com/wp-content/uploads/2014/03/KeyLines-White-Paper.pdf>, (Mar. 2014), 8 pgs.

"Analytics for Data Driven Startups", Trak.io, [Online]. Retrieved from the Internet: <URL: http://trak.io/>, (Accessed: Jul. 18, 2013), 3 pgs.

"U.S. Appl. No. 13/827,491, Final Office Action dated Jun. 22, 2015", 28 pgs.

"U.S. Appl. No. 13/827,491, Non Final Office Action dated Mar. 30, 2016", 25 pgs.

"U.S. Appl. No. 13/827,491, Non Final Office Action dated Oct. 9, 2015", 16 pgs.

"U.S. Appl. No. 13/827,491, Non Final Office Action dated Dec. 1, 2014", 5 pgs.

"U.S. Appl. No. 14/141,252, Non Final Office Action dated Oct. 8, 2015", 11 pgs.

"U.S. Appl. No. 14/225,006, Advisory Action dated Dec. 21, 2015", 4 pgs.

"U.S. Appl. No. 14/225,006, Final Office Action dated Sep. 2, 2015", 28 pgs.

"U.S. Appl. No. 14/225,006, First Action Interview Pre-Interview Communication dated Feb. 27, 2015", 5 pgs.

"U.S. Appl. No. 14/225,006, First Action Interview Pre-Interview Communication dated Sep. 10, 2014", 4 pgs.

"U.S. Appl. No. 14/225,084, Examiner Interview Summary dated Jan. 4, 2016", 3 pgs.

"U.S. Appl. No. 14/225,084, First Action Interview Pre-Interview Communication dated Feb. 20, 2015", 5 pgs.

"U.S. Appl. No. 14/225,084, First Action Interview Pre-Interview Communication dated Sep. 2, 2014", 17 pgs.

"U.S. Appl. No. 14/225,084, Non Final Office Action dated Sep. 11, 2015", 13 pgs.

"U.S. Appl. No. 14/225,084, Notice of Allowance dated May 4, 2015", 26 pgs.

"U.S. Appl. No. 14/225,160, Advisory Action dated May 20, 2015", 7 pgs.

"U.S. Appl. No. 14/225,160, Final Office Action dated Feb. 11, 2015", 30 pgs.

"U.S. Appl. No. 14/225,160, First Action Interview Pre-Interview Communication dated Jul. 29, 2014", 19 pgs.

"U.S. Appl. No. 14/225,160, First Action Interview Pre-Interview Communication dated Oct. 22, 2014", 6 pgs.

"U.S. Appl. No. 14/225,160, Non Final Office Action dated Aug. 12, 2015", 23 pgs.

"U.S. Appl. No. 14/306,138, Advisory Action dated Dec. 24, 2015", 4 pgs.

"U.S. Appl. No. 14/306,138, Examiner Interview Summary dated Dec. 3, 2015", 3 pgs.

"U.S. Appl. No. 14/306,147, Final Office Action dated Dec. 24, 2015", 22 pgs.

"U.S. Appl. No. 14/319,161, Final Office Action dated Jan. 23, 2015", 21 pgs.

(56) References Cited

OTHER PUBLICATIONS

"U.S. Appl. No. 14/319,161, Notice of Allowance dated May 4, 2015", 6 pgs.
"U.S. Appl. No. 14/323,935, Notice of Allowance dated Oct. 1, 2015", 8 pgs.
"U.S. Appl. No. 14/451,221, Non Final Office Action dated Oct. 21, 2014", 16 pgs.
"U.S. Appl. No. 14/463,615, Advisory Action dated Sep. 10, 2015", 3 pgs.
"U.S. Appl. No. 14/463,615, Final Office Action dated May 21, 2015", 31 pgs.
"U.S. Appl. No. 14/463,615, First Action Interview Pre-Interview Communication dated Jan. 28, 2015", 29 pgs.
"U.S. Appl. No. 14/463,615, First Action Interview Pre-Interview Communication dated Nov. 13, 2014", 4 pgs.
"U.S. Appl. No. 14/463,615, Non Final Office Action dated Dec. 9, 2015", 44 pgs.
"U.S. Appl. No. 14/479,863, First Action Interview Pre-Interview Communication dated Dec. 26, 2014", 5 pgs.
"U.S. Appl. No. 14/479,863, Notice of Allowance dated Mar. 31, 2015", 23 pgs.
"U.S. Appl. No. 14/483,527, Final Office Action dated Jun. 22, 2015", 17 pgs.
"U.S. Appl. No. 14/483,527, First Action Interview Pre-Interview Communication dated Jan. 28, 2015", 6 pgs.
"U.S. Appl. No. 14/483,527, Non Final Office Action dated Oct. 28, 2015", 20 pgs.
"U.S. Appl. No. 14/516,386, Applicant-Initiated Interview Summary dated Jun. 30, 2016", 5 pgs.
"U.S. Appl. No. 14/516,386, First Action Interview Pre-Interview Communication dated Feb. 24, 2016", 16 pgs.
"U.S. Appl. No. 14/552,336, First Action Interview Pre-Interview Communication dated Jul. 20, 2015", 18 pgs.
"U.S. Appl. No. 14/552,336, Notice of Allowance dated Nov. 3, 2015", 13 pgs.
"U.S. Appl. No. 14/562,524, First Action Interview Pre-Interview Communication dated Sep. 14, 2015", 12 pgs.
"U.S. Appl. No. 14/562,524, First Action Interview Pre-Interview Communication dated Nov. 10, 2015", 6 pgs.
"U.S. Appl. No. 14/571,098, First Action Interview dated Aug. 24, 2015", 4 pgs.
"U.S. Appl. No. 14/571,098, First Action Interview Pre-Interview Communication dated Mar. 11, 2015", 4 pgs.
"U.S. Appl. No. 14/571,098, First Action Interview Pre-Interview Communication dated Aug. 5, 2015", 4 pgs.
"U.S. Appl. No. 14/571,098, First Action Interview Pre-Interview Communication dated Nov. 10, 2015", 5 pgs.
"U.S. Appl. No. 14/631,633, First Action Interview Pre-Interview Communication dated Sep. 10, 2015", 5 pgs.
"U.S. Appl. No. 14/676,621, Examiner Interview Summary dated Jul. 30, 2015", 5 pgs.
"U.S. Appl. No. 14/676,621, Final Office Action dated Oct. 29, 2015", 10 pgs.
"U.S. Appl. No. 14/746,671, First Action Interview Pre-Interview Communication dated Nov. 12, 2015", 19 pgs.
"U.S. Appl. No. 14/746,671, Notice of Allowance dated Jan. 21, 2016", 7 pgs.
"U.S. Appl. No. 14/800,447, First Action Interview—Pre-Interview Communication dated Dec. 10, 2015", 6 pgs.
"U.S. Appl. No. 14/813,749, Non Final Office Action dated Sep. 28, 2015", 22 pgs.
"U.S. Appl. No. 14/842,734, First Action Interview Pre-Interview Communication dated Nov. 19, 2015", 17 pgs.
"U.S. Appl. No. 14/923,364, Notice of Allowance dated May 6, 2016", 36 pgs.
"U.S. Appl. No. 14/923,374, First Action Interview—Office Action Summary dated May 23, 2016", 4 pgs.
"U.S. Appl. No. 14/923,374, First Action Interview—Pre-Interview Communication dated Feb. 9, 2016", 4 pgs.
"U.S. Appl. No. 15/017,324, First Action Interview Pre-Interview Communication dated Apr. 22, 2016", 20 pgs.
"Beta Testing on the Fly", TestFlight, [Online]. Retrieved from the Internet: <URL: https://testflightapp. com/>, (Accessed: Jul. 18, 2013), 3 pgs.
"Countly", Countly Mobile Analytics, [Online]. Retrieved from the Internet: <URL: http://count.ly/products/screenshots, (accessed Jul. 18, 2013), 9 pgs.
"DISTIMO—App Analytics", [Online]. Retrieved from the Internet: <URL: http://www.distimo.com/app-analytics, (accessed Jul. 18, 2013), 5 pgs.
"European Application Serial No. 14187996.5, Extended European Search Report dated Feb. 12, 2015", 7 pgs.
"European Application Serial No. 14191540.5, Extended European Search Report dated May 27, 2015", 9 pgs.
"European Application Serial No. 14200246.8, Extended European Search Report dated May 29, 2015", 8 pgs.
"European Application Serial No. 14200298.9, Extended European Search Report dated May 13, 2015", 7 pgs.
"European Application Serial No. 15181419.1, Extended European Search Report dated Sep. 29, 2015", 7 pgs.
"European Application Serial No. 15184764.7, Extended European Search Report dated Dec. 14, 2015", 8 pgs.
"Flurry Analytics", [Online]. Retrieved from the Internet: <URL: http://www.flurry.com/, (accessed Jul. 18, 2013), 14 pgs.
"Google Analytics Official Website—Web Analytics & Reporting", [Online]. Retrieved from the Internet: <URL: http ://www.google. com/ analytics/index.html, (accessed Jul. 18, 2013), 22 pgs.
"Great Britain Application Serial No. 1404486.1, Combined Search Report and Examination Report dated Aug. 27, 2014", 5 pgs.
"Great Britain Application Serial No. 1404486.1, Office Action dated May 21, 2015", 2 pgs.
"Great Britain Application Serial No. 1404489.5, Combined Search Report and Examination Report dated Aug. 27, 2014", 5 pgs.
"Great Britain Application Serial No. 1404489.5, Office Action dated May 21, 2015", 3 pgs.
"Great Britain Application Serial No. 1404489.5, Office Action dated Oct. 6, 2014", 1 pg.
"Great Britain Application Serial No. 1404499.4, Combined Search Report and Examination Report dated Aug. 20, 2014", 6 pgs.
"Great Britain Application Serial No. 1404499.4, Office Action dated Jun. 11, 2015", 5 pgs.
"Great Britain Application Serial No. 1404499.4, Office Action dated Sep. 29, 2014", 1 pg.
"Help File for ModelRisk Version 5—Part 1", Vose Software, (2007), 375 pgs.
"Help File for ModelRisk Version 5—Part 2", Vose Software, (2007), 362 pgs.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Mixpanel: Actions speak louder than page views", Mobile Analytics, [Online]. Retrieved from the Internet: <URL: https://mixpanel.com/>, (Accessed: Jul. 18, 2013), 13 pgs.
"Mobile App Marketing & Analytics", Localytics, [Online]. Retrieved from the Internet: <URL: http://www.localytics.com/>, (Accessed: Jul. 18, 2013), 12 pgs.
"More than android analytics", UserMetrix, [Online]. Retrieved from the Internet: <URL: http://usermetrix.com/android-analytics>, (Accessed: Jul. 18, 2013), 3 pgs.
"More Than Mobile Analytics", Kontagent, [Online]. Retrieved from the Internet: <URL: http://www. kontagent. com/>, (Accessed: Jul. 18, 2013), 9 pgs.
"Multimap", Wikipedia, [Online]. Retrieved from the Internet: <URL: https://en.wikipedia.org/w/index.php?title=Multimap&oidid=530800748>, (Jan. 1, 2013), 2 pgs.
"Netherlands Application Serial No. 2012417, Netherlands Search Report dated Sep. 18, 2015", W/ English Translation, 9 pgs.

(56) References Cited

OTHER PUBLICATIONS

"Netherlands Application Serial No. 2012421, Netherlands Search Report ated Sep. 18, 2015", 8 pgs.
"Netherlands Application Serial No. 2012438, Search Report dated Sep. 21, 2015", 8 pgs.
"New Zealand Application Serial No. 622473, First Examination Report dated Mar. 27, 2014", 3 pgs.
"New Zealand Application Serial No. 622473, Office Action dated Jun. 19, 2014", 2 pgs.
"New Zealand Application Serial No. 622513, Office Action dated Apr. 3, 2014", 2 pgs.
"New Zealand Application Serial No. 628161, First Examination Report dated Aug. 25, 2014", 2 pgs.
"Piwik—Free Web Analytics Software", Piwik, [Online]. Retrieved from the Internet: <URL: http://piwik.org/>, (Accessed: Jul. 19, 2013), 18 pgs.
"Realtime Constant Customer Touchpoint", Capptain—Pilot your apps, [Online] retrieved from the internet: <http://www.capptain.com>, (accessed Jul. 18, 2013), 6 pgs.
"Refresh CSS ellipsis when resizing container", Stack Overflow, [Online]. Retrieved from the Internet: <URL: http://stackoverflow.com/questions/17964681/refresh-css-ellipsis-when-resizing-container>, Accessed: May 18, 2015, (Jul. 31, 2013), 1 pg.
"Smart Thinking for Super Apps", [Online]. Retrieved from the Internet: <http://www.appacts.com>, (Jul. 18, 2013), 4 pgs.
"Visualizing Threats: Improved Cyber Security Through Network Visualization", Keylines.com, [Online] retrieved from the internet: <http://keylines.com/wp-content/uploads/2014/04/Visualizing-Threats1.pdf>, (May 12, 2014), 10 pgs.
"Welcome to StatCounter—Visitor Analysis for Your Website", StatCounter—Free Invisible Web Tracker, Hit Counter and Web Stats, [Online]. Retrieved from the Internet: <URL: http://statcounter.com/>, (Accessed: Jul. 19, 2013), 17 pgs.
Apsalar, "Data Powered Mobile Advertising", Free Mobile App Analytics and various analytics related screen shots, (Jul. 18, 2013), 8 pgs.
Celik, T, "CSS Basic User Interface Module Level 3 (CSS3 UI)", Section 8; Resizing and Overflow, [Online] retrieved from the internet: <http://www.w3.org/TR/2012/WD-css3-ui-20120117/#resizing-amp-overflow>, (Jan. 17, 2012), 1-58.
Chaudhuri, Surajit, et al., "An Overview of Business Intelligence Technology", Communications of the ACM, vol. 54, No. 8., (Aug. 2011), 88-98.
Cohn, David, et al., "Semi-supervised Clustering with User Feedback", Cornell University, Constrained Clustering: Advances in Algorithms, Theory, and Applications 4.1, (2003), 9 pgs.
Gorr, et al., "Crime Hot Spot Forecasting: Modeling and Comparative Evaluation", Grant 98-IJ-CX-K005, (May 6, 2002), 37 pgs.
Gu, Lifang, et al., "Record Linkage: Current Practice and Future Directions", (Jan. 15, 2004), 32 pgs.
Hansen, D., et al., "Analyzing Social Media Networks with NodeXL: Insights from a Connected World", Chapter 4, pp. 53-67 and Chapter 10, pp. 143-164, (Sep. 2010), 53-67: 143-164.
Hua, Yu, et al., "A Multi-attribute Data Structure with Parallel Bloom Filters for Network Services", HiPC 2006, LNCS 4297, (2006), 277-288.
Manno, et al., "Introducing Collaboration in Single-user Applications through the Centralized Control Architecture", (2010), 10 pgs.
Sigrist, Christian, et al., "PROSITE, a Protein Domain Database for Functional Characterization and Annotation", Nucleic Acids Research, vol. 38, (2010), D161-D166.
Valentini, Giorgio, et al., "Ensembles of Learning Machines", Lecture Notes in Computer Science: Neural Nets, Springer Berlin Heidelberg, (Sep. 26, 2002), 3-20.
Wang, Guohua, et al., "Research on a Clustering Data De-Duplication Mechanism Based on Bloom Filter", IEEE, (2010), 5 pgs.

\* cited by examiner

US 11,250,425 B1

GENERATING A STATISTIC USING ELECTRONIC TRANSACTION DATA

RELATED APPLICATIONS

This application claims the priority benefit of U.S. Provisional Application No. 62/428,419, entitled "GENERATING A STATISTIC USING ELECTRONIC TRANSACTION DATA," filed Nov. 30, 2016, which is hereby incorporated herein by reference in its entirety.

TECHNICAL FIELD

Embodiments of the present disclosure generally relates to the technical field of special-purpose machines that receive transaction data and perform an analysis of the received transaction data including computerized variants of such special-purpose machines and improvements to such variants, and to the technologies by which such special-purpose machines become improved compared to other special-purpose machines that receive transaction data and perform the analysis of the received transaction data. Specifically, the present disclosure addresses systems and methods to generating a statistic that measures large-scale activity using the transaction data.

BACKGROUND

Conventionally, systems that measure large-scale activity using a merchant survey implementation provide inaccurate results.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows describes systems, methods, techniques, instruction sequences, and computing machine program products that illustrate example embodiments of the present subject matter. In the following description, for the purposes of explanation, numerous specific details are set forth in order to provide an understanding of various example embodiments of the subject matter discussed herein. It will be evident, however, to those skilled in the art, that embodiments of the subject matter may be practiced without these specific details.

Example methods (e.g., algorithms) facilitate disambiguation of a search criterion, providing one or more users with notification thereof, or both, and example systems (e.g., special-purpose machines) are configured to facilitate disambiguation of the search criterion, providing one or more users with notification thereof, or both. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

Figure 1:
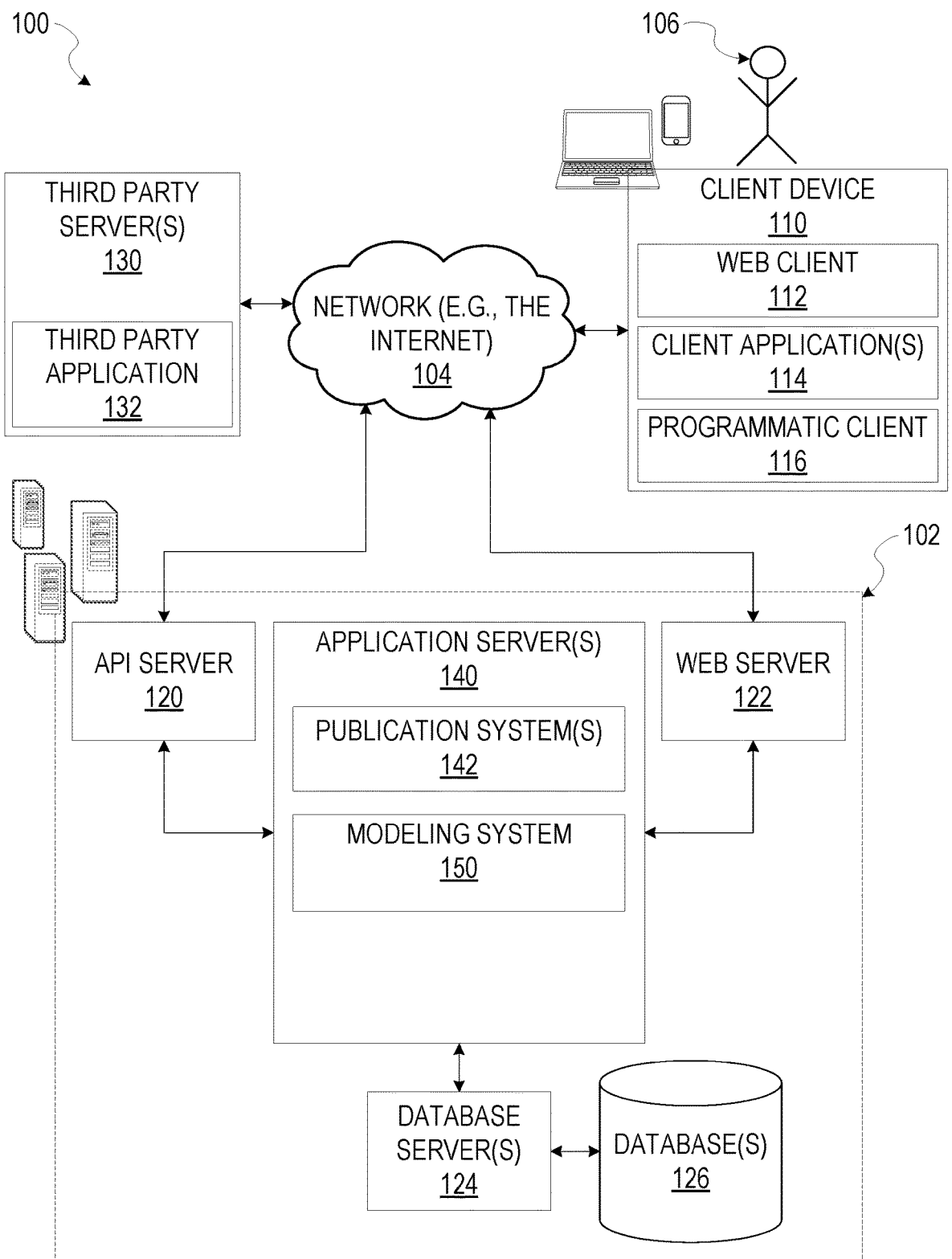
FIG. 1 is a block diagram illustrating a networked system, according to some example embodiments.

With reference to FIG. 1, an example embodiment of a high-level client-server-based network architecture 100 is shown. A networked system 102, in the example forms of a network-based publication or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

The client device 110 may comprise, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may utilize to access the networked system 102. In some embodiments, the client device 110 includes components that are used to display information (e.g., in the form of user interfaces). In further embodiments, the client device 110 may comprise one or more of touch screens, accelerometers, gyroscopes, cameras, microphones, global positioning system (GPS) devices, and so forth. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, electronic mail (email) application.

A user 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 host the publication system 142 which may comprise one or more modules, engines, or applications and each of which may be embodied as hardware, software, firmware, circuitry, or any combination thereof. The application servers 140 are, in turn, shown to be coupled to one or more database servers 124 that facilitate access to one or more information storage repositories or database(s) 126. In an example embodiment, the databases 126 are storage devices that store information communicated to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, publication, that are supported by the relevant applications of the networked system 102.

The publication systems 142 provide a number of publication functions and services to users 106 that access the networked system 102. While the publication system 142 is shown in FIG. 1 to form part of the networked system 102, it will be appreciated that, in alternative embodiments, the publication system 142 forms part of a service that is separate and distinct from the networked system 102.

The modeling system 150 provides functionality operable to analyze transaction data and provide a statistic that measure transaction activity using the transaction data. For example, the modeling system 150 may access the transaction data from the databases 126, the third party servers 130, the publication system 142, and other sources. In some example embodiments, the modeling system 150 may analyze the user data to generate the statistic.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example.

The web client 112 accesses the various publication systems 142 via the web interface supported by the web server 122. Similarly, the programmatic client 116 accesses the various services and functions provided by the publication systems 142 via the programmatic interface provided by the API server 120. The programmatic client 116 may, for example, be a client application to enable users to access data provided by the networked system 102 in an off-line manner, and to perform batch-mode communications between the programmatic client 116 and the networked system 102.

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIGS. 3-5, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

Figure 2:
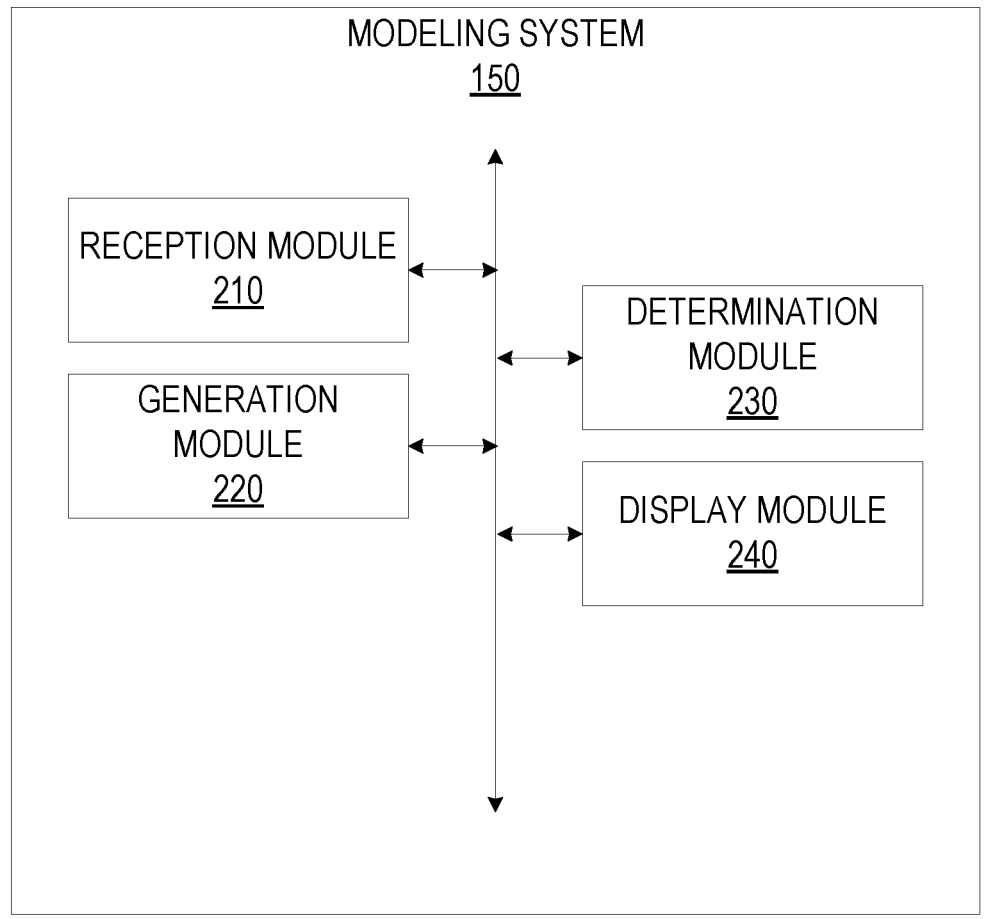
FIG. 2 is a block diagram illustrating components of the modeling system, according to some example embodiments.

FIG. 2 is a block diagram illustrating components of the modeling system 150, according to some example embodiments. The modeling system 150 is shown as including a reception module 210, a generation module 220, a determination module 230, and a display module 240, all configured to communicate with each other (e.g., via a bus, shared memory, or a switch). Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

In various example embodiments, the reception module 210 is configured to receive transaction data that indicates information regarding transactions performed by a group of merchants. In some instances, the transaction data indicates a total number of transactions performed by the group of merchants. In further instances, the transaction data indicates a total amount of revenue generated from the transactions performed by the group of merchants.

In various example embodiments, the transaction data is arranged or organized into components. Moreover, component represents an individual transaction. Also, for each individual transaction, the transaction data indicates an amount of revenue and a merchant ID. In other words, each component includes the amount of revenue and the merchant ID to identify a respective merchant from the group of merchants that performed the transaction. In various example embodiments, the transactions do not occur simultaneously. Instead, they occur over a length of time (e.g., day, week, month, or year). Therefore, each transaction may also include a timestamp to indicate when the transaction was completed.

In further example embodiments, the transaction data may indicate, for each merchant, a time-dependent attribute that relates to transaction activity of the respective merchant. The time-dependent attribute includes at least one of revenue, days of activity, frequency of transactions, and the like.

In various example embodiments, the transaction data is received from a third party server that provides credit card processing services to the group of merchants (e.g., First Data Corporation). As a result, the transaction data includes credit card transactions performed by the group of merchants. In further example embodiments, the transaction data is received in response to a query to the third party server (e.g., querying a database maintained by the third party server).

In various example embodiments, the generation module 220 is configured to generate an activity filter based on the transaction data. In various example embodiments, the activity filter indicates a threshold amount of transaction activity that corresponds to a period of time, which is used as criteria for selecting the active merchants. Examples of activity filters include filters based on at least one or more of the following: a number of days transacted within a given period, or growth rates over a variable range of time (e.g., variable period of time). The activity filters may also include comparing the growth rates of the set of merchants over the variable range of time. In some instances, merchants that exceed a threshold rate of growth corresponding to a certain range of time will be selected.

The generation module 220 generates the activity filter using transaction data that corresponds to a period of time (e.g., transactions that occur during the period of time). In various example embodiments, the threshold amount of transaction activity is statistically correlated with the transaction activity of the group of merchants during the period of time. As an example, the threshold amount of transaction activity is an average amount of transaction activity, performed by the group of merchants, during the period of time. The transaction activity of the group of merchants may be measured by their growth rates, or a number of days transacted within a given period. In further example embodiments, the threshold amount of transaction activity is indicated a value or a range of values. The period of time, in some instances, is a variable length of time set by the generation module 220 and can be adjusted or changed. For example, the period of time could be a week, a month, or any other variable length of time.

In various example embodiments, the determination module 230 is configured to count a total number of transactions performed by the group of merchants during the period of time. The count may then be used by the determination module 230 to calculate the average amount of transaction activity for the activity filter.

In various example embodiments, the generation module 220 is configured to generate more than one activity filter based on the transaction data. In some instances, the generation module 220 generates a subsequent activity filter that indicates a threshold amount of activity for a subsequent period of time. Similar to the generation of the activity filter, the generation module 220 generates the subsequent activity filter using transaction data that corresponds to a subsequent period of time (e.g., transactions that occur during the subsequent period of time).

In various example embodiments, the determination module 230 is configured to select active merchants from the group of merchants using the generated activity filter. In this regard, the determination module 230 selects active merchants that each performs the threshold amount of transaction activity during the period of time indicated by the activity filter. The selected active merchants, in some cases, are merchants that engage in a similar amount of transaction activity during the period of time and therefore behave like one another. As a result, the determination module 230 is further configured to refrain from selecting merchants that perform an anomalous amount of transaction activity during the period of time.

In various example embodiments, the determination module 230 is further configured to select subsequent active merchants that each performs the threshold amount of transaction activity during the subsequent period of time. In various example embodiments, the active merchants and the subsequent active merchants entirely overlap. In further embodiments, the active merchants and the subsequent active merchants partially overlap or do not overlap at all. For example, these situations may occur when a merchant that is considered active for the period of time but is no longer considered active for the subsequent period of time.

In various example embodiments, the determination module 230 is configured to extract, from the transaction data, information regarding transactions performed by the active merchants. The determination module 230 is further configured to extract information regarding transactions performed by the subsequent active merchants. The extracted information may include an amount of revenue generated by the active merchants and an amount of revenue generated by the subsequent active merchants. The extracted information may also include a number of transactions performed by active merchants and a number of transactions performed by the subsequent active merchants.

In various example embodiments, the generation module 220 generates weights for the active merchants based on census data that indicates a distribution of activity across the active merchants. The active merchants may include merchants from more than industry (e.g., retail or travel). Accordingly, the census data may reveal a percentage of total transactions from the census that occur from merchants in the retail industry and a percentage of total transactions from the census that occur from merchants in the travel industry.

Moreover, the generation module 220 normalizes the information regarding the transactions performed by the active merchants based on the generated weights. This allows the information regarding the transactions to accurate reflect the distribution of activity across the active merchants indicated in the census data.

In various example embodiments, the generation module 220 generates a statistic based on the amount of revenue generated by the active merchants and the amount of revenue generated by the further active merchants. The statistic is used to an estimate to predict changes or fluctuations in transaction activity performed by the group of merchants between the period of time and the subsequent period of time. For instance, the statistic measures the change in transaction activity relative to a previous period of time. In various example embodiments, the generation module 220 generates an interface that depicts the statistic. For example, the statistic is plotted in a graph that depicts a value of the statistic over an axis that represents time.

In further example embodiments, the generation module 220 generates the statistic based on transaction data of the active merchants and/or transaction data of the further active merchants. As stated earlier, the transaction data indicates, for each merchant, a time-dependent attribute that relates to transaction activity of the respective merchant. The time-dependent attribute includes at least one of revenue, days of activity, frequency of transactions, and the like. Therefore, the transaction data may be sliced in a variety of ways and the statistic may be generated using any of the time-dependent attributes of the active merchants and/or the further active merchants. In various example embodiments, using the transaction data of both the active merchants and the further active merchants increases the accuracy of the statistic. Moreover, the generated statistic indicates fluctuations in the time-dependent attributes of the group of merchants.

In further example embodiments, the statistic is a series of values. Moreover, for each additional period of time, a value is added to the series of values.

In various example embodiments, the display module 240 causes display of the generated interface on a client device. The display module 240 transmits that to the client device which results in display of the generated interface that depicts the statistic.

Figure 3:
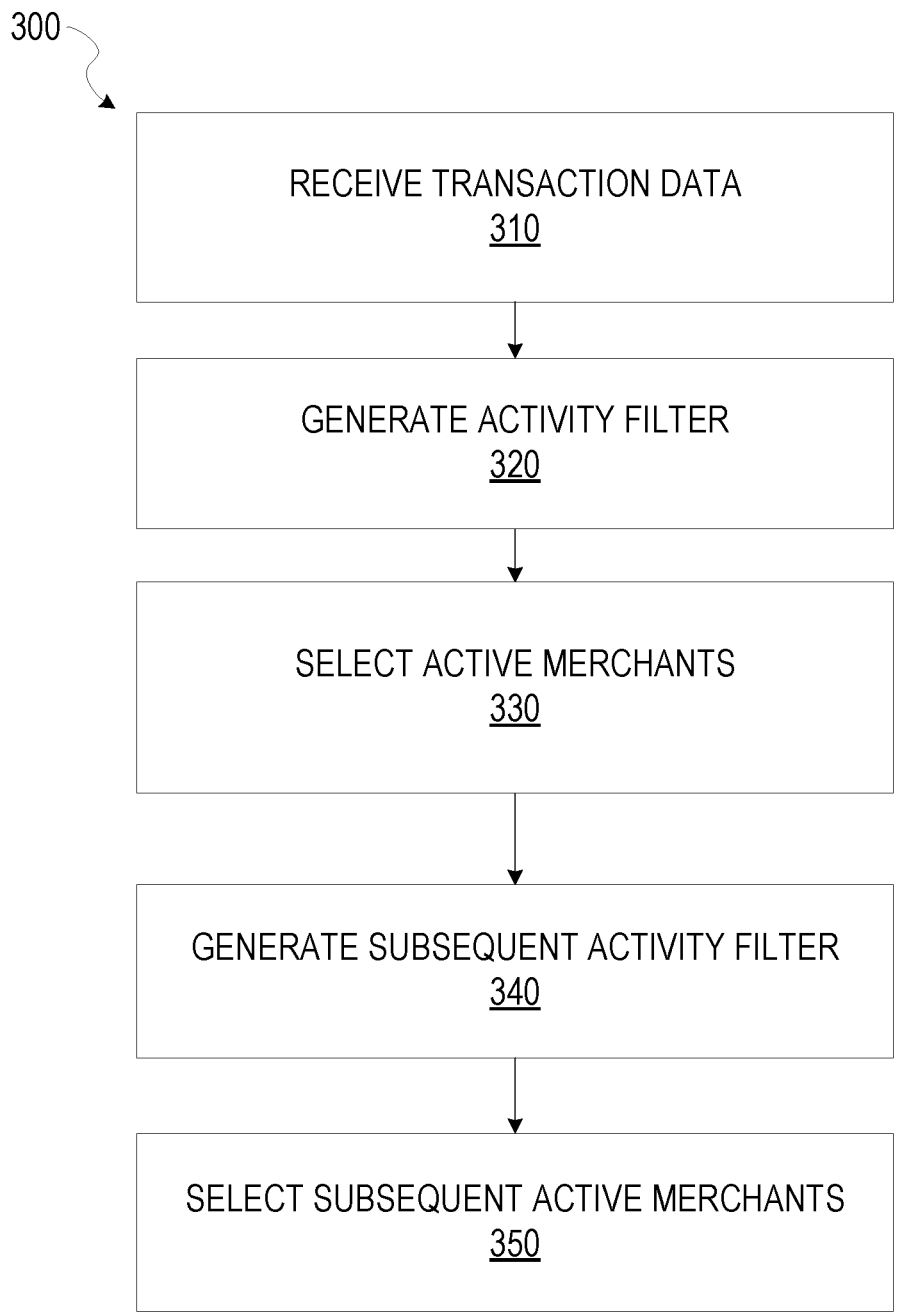
FIG. 3-5 are flowcharts illustrating operations of the modeling system in performing a method of generating a statistic, according to some example embodiments.
Figure 4:
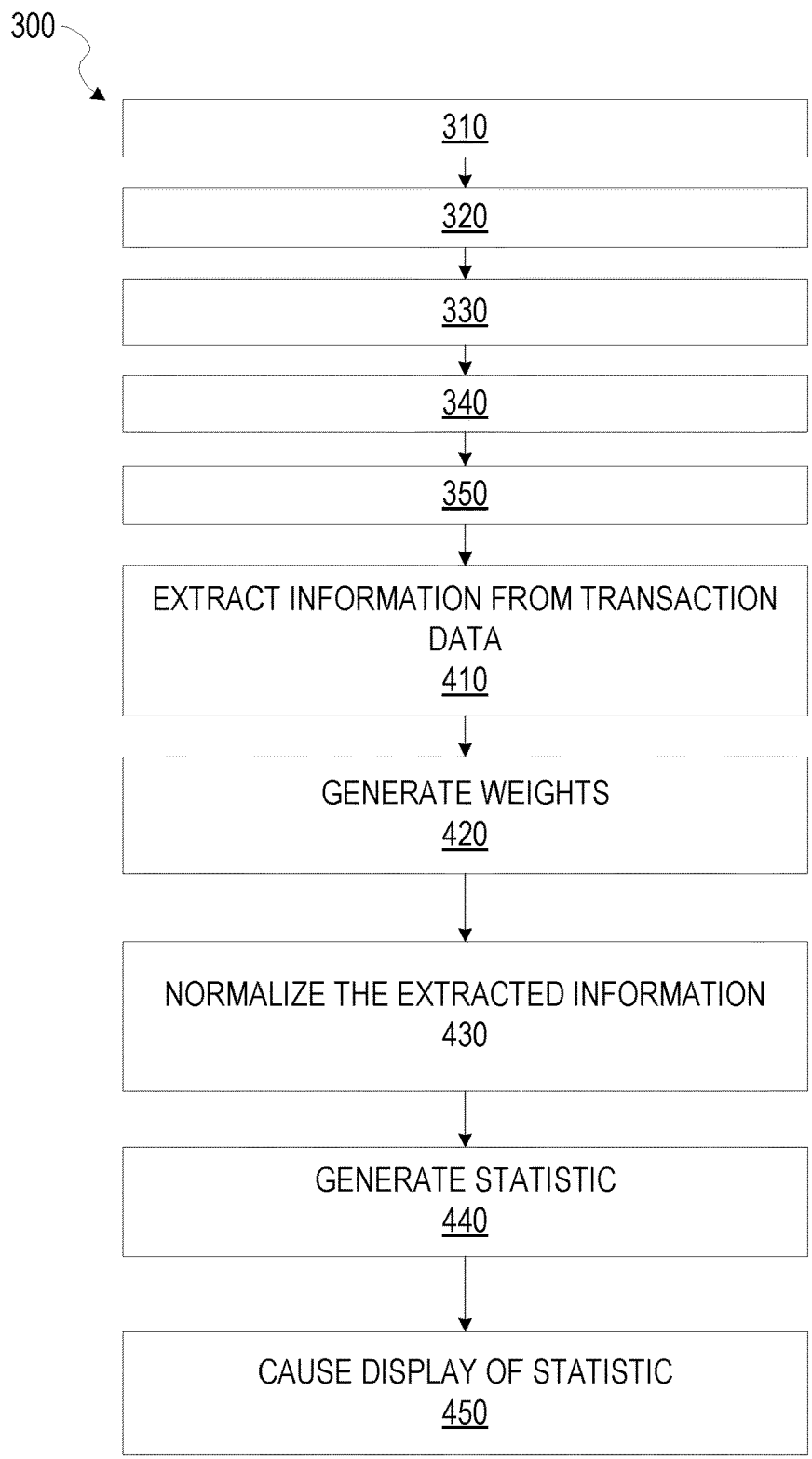
Figure 5:
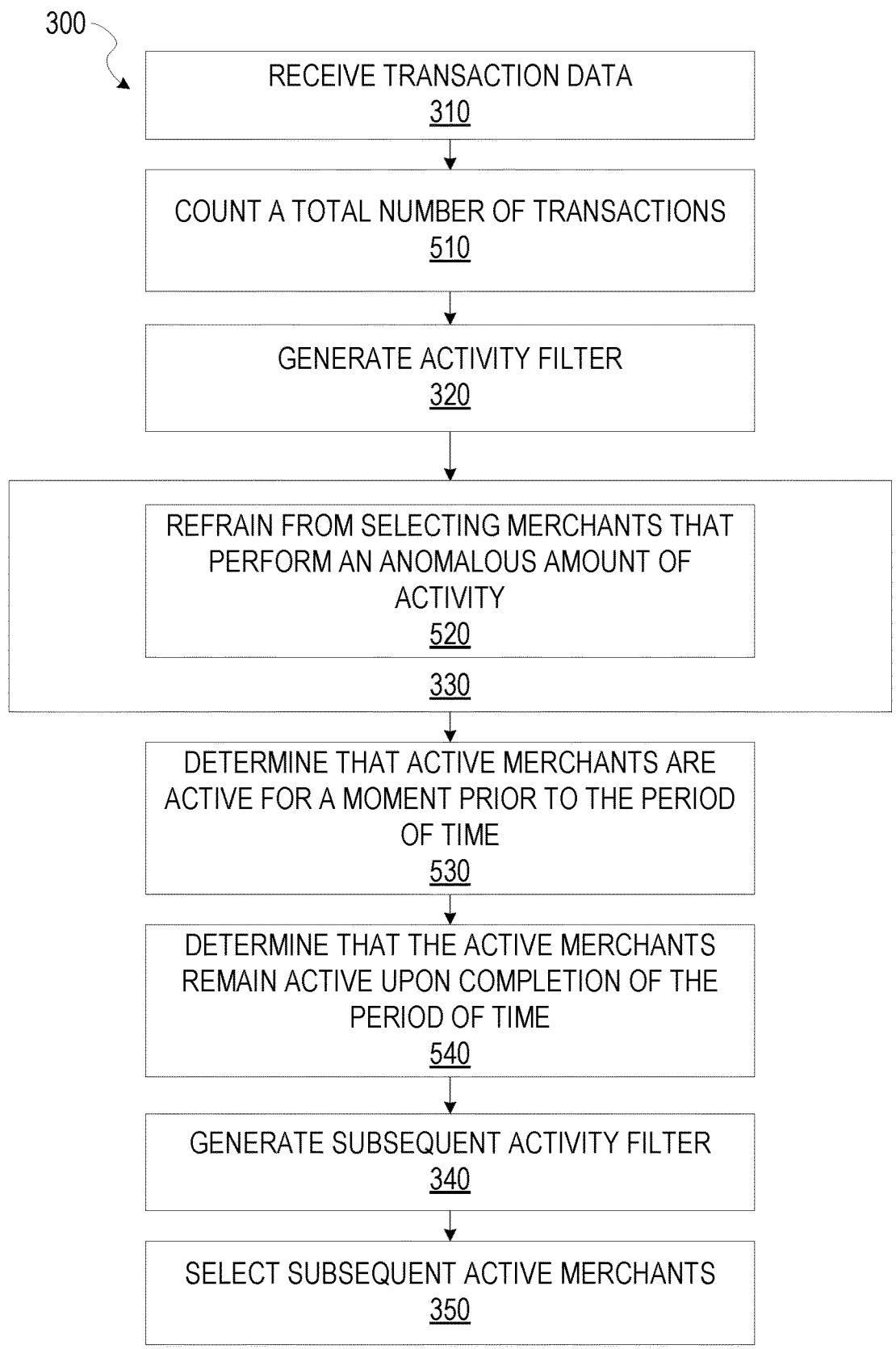

FIG. 3-5 are flowcharts illustrating operations of the modeling system 150 in performing a method 300 of generating a statistic, according to some example embodiments. Operations in the method 300 may be performed in part or in whole by components of the modeling system 150, which can be embodied either in whole or in part in one or more application servers 140 of a networked system 102 using components described above with respect to FIG. 2. Accordingly, the method 300 is described by way of example with reference to the modeling system 150. However, it shall be appreciated that at least some of the operations of the method 300 may be deployed on various other hardware configurations or be performed by similar components residing elsewhere in the network architecture 100. Therefore, the method 300 is not intended to be limited to the modeling system 150. As shown in FIG. 3, the method 300 includes operations 310, 320, 330, 340, and 350.

At operation 310, the reception module 210 receives transaction data transaction data that indicates information regarding transactions performed by a group of merchants. As stated above, the transaction data includes information regarding a total number of transactions performed by the group of merchants or a total amount of revenue generated from the transactions performed by the group of merchants. The transaction data may be received from a third party server (e.g., third party server 130). Further, the transaction data may include credit card transactions performed by the group of merchants and processed by the third party server.

At operation 320, the generation module 220 generates an activity filter based on the transaction data. In various example embodiments, the activity filter indicates a threshold amount of transaction activity that corresponds to a period of time, which is used as criteria for selecting the active merchants. As an example, the activity filter generated in the operation 320 may correspond to the month of January. As stated above, the period of time is adjustable may be adjusted to a variable length of time. Further examples of activity filters include filters based on at least one or more of the following: a number of days transacted within a given period, or growth rates over a variable range of time (e.g., variable period of time).

At operation 330, the determination module 230 selects active merchants from the group of merchants using the generated activity filter. Therefore, at operation 330, the determination module 230 selects active merchants for the month of January.

At operation 340, the generation module 220 generates a subsequent activity filter. In various example embodiments, the activity filter indicates a threshold amount of transaction activity that corresponds to a subsequent period of time, which is used as criteria for selecting the subsequent active merchants. As an example, the subsequent activity filter generated in the operation 340 may correspond to the month of February.

At operation 350, the determination module 230 selects subsequent active merchants that each performs the threshold amount of transaction activity during the subsequent period of time. Therefore, at operation 350, the determination module 230 selects active merchants for the month of February.

As shown in FIG. 4, the method 300 may include one or more of operations 410, 420, 430, 440, and 450. Each of the operations 410, 420, 430, 440, and 450 may be performed after the operation 350 of FIG. 3.

At operation 410, the determination module 230 extracts information from the transaction data. For instance, the determination module 230 extracts information that indicates an amount of revenue generated by the merchants selected at operations 320 and 340 (e.g., active and subsequent active merchants). Alternatively, the determination module 230 extracts information that indicates an amount of revenue generated by the merchants selected at operations 320 and 340. Other information regarding transaction data may include a number of distinct days of activity for the active merchants during the period of time and a number of distinct days of activity for the subsequent active merchants during the subsequent period of time.

At operation 420, the generation module 220 generates weights for the active merchants based on census data that indicates a distribution of activity across the active merchants. The generation module 220 may also generate weights for the subsequent active merchants based on census data that indicates a distribution of activity across the subsequent active merchants. For example, each of the active merchants may belong to an industry or a category, and the census data may indicate a percentage of transactions that come from each industry or category.

At operation 430, the determination module 230 normalizes the extracted information regarding the transactions performed by the active merchants based on the generated weights. For example, if the census data indicates that a larger amount of activity originates from merchants in industry A as compared to an amount of activity originating from merchants outside of industry A, then the determination module 230 may place a greater weight on the information regarding transactions performed merchants in industry A. The determination module 230 may also normalize the extracted information regarding the transactions performed by the subsequent active merchants.

At operation 440, the generation module 220 generates a statistic based on the amount of revenue generated by the active merchants and the amount of revenue generated by the further active merchants. As stated above, the statistic is used to an estimate to predict changes or fluctuations in transaction activity performed by the group of merchants between the period of time and the subsequent period of time. For instance, the statistic measures the change in transaction activity relative to a previous period of time.

At operation 450, the display module 240 causes display of the statistic. In some instances, the statistic is plotted in a user interface that is generated by the generation module 220.

As shown in FIG. 5, the method 300 may include one or more of operations 510, 520, 530, and 540. The operation 510 may be performed after the operation 310 but prior to the operation 320. The operation 520 may be performed as part of the operation 330.

At operation 510, the determination module 230 counts a total number of transactions performed by the group of merchants during the period of time. In further embodiments, the determination module 230 counts a total number of transactions performed by the group of merchants during the subsequent period of time. These counts may be used by the generation module 220 at the operations 320 and 340 to generate the activity filters.

At operation 520, the determination module 230 refrains from selecting merchants that perform an anomalous amount of activity. As a result, merchants not selected as active merchants 330 may be merchants that perform an anomalous amount of activity. The anomalous amount of activity may result from an occurrence of an event at a particular geographical location that coincides with the period of time indicated by the activity filter. For example, in the event of a hurricane, some merchants may experience spike in terms of transaction activity whereas other merchants may experience a drop in terms of transaction activity. As another example, in the event of a holiday, some merchants may experience a spike in terms of transaction activity.

At operation 530, the determination module 230 determines that the active merchants are active for a moment prior to the period of time indicated by the activity filter. This ensures that the determination module 230 does not select merchants that begin their transaction activities after the period of time begins.

At operation 540, the determination module 230 determines that the active merchants remain active upon completion of the period of time indicated by the activity filter. This ensures that the determination module 230 does not select merchants that finish their transaction activities before the period of time elapses.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 6:
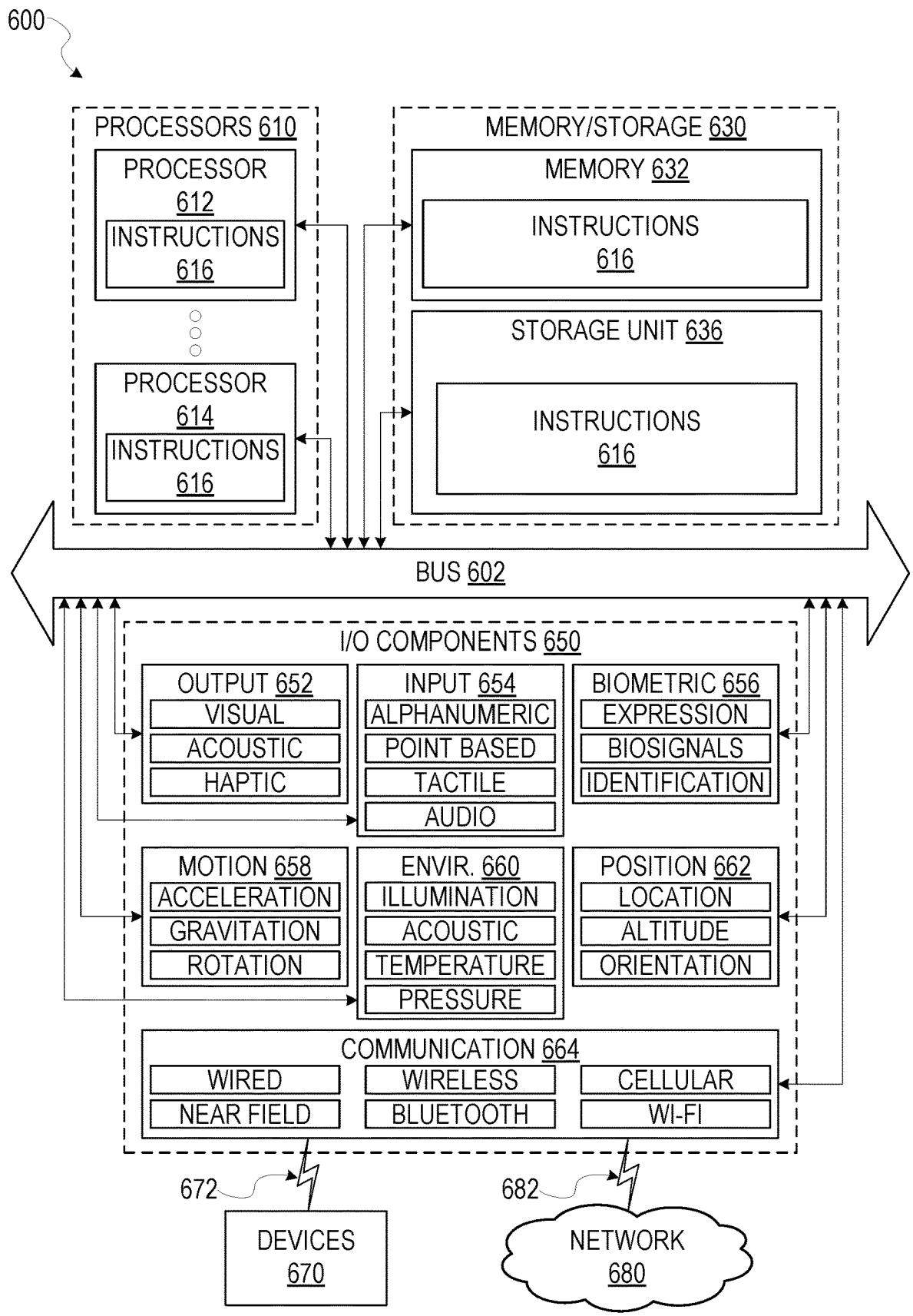
FIG. 6 illustrates a diagrammatic representation of a machine in the form of a computer system within which a set of instructions may be executed for causing the machine to perform any one or more of the methodologies discussed herein, according to an example embodiment.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example the instructions may cause the machine to execute the flow diagrams of FIGS. 3-5. The instructions transform the general, non-programmed machine into a particular machine specially configured to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving transaction data regarding transactions performed by a set of merchants, the transaction data indicating a number of transactions performed by each merchant in the set of merchants;
   identifying a set of active merchants from the set of merchants based on the transaction data, the set of active merchants being a subset of the set of merchants, wherein identifying the set of active merchants comprises:
   for each respective merchant from the set of merchants, determining, based on the transaction data, a number of transactions performed by the respective merchant during a first period of time;
   comparing the number of transactions performed by the respective merchant during the first period of time to a threshold number of transactions, yielding a comparison;
   determining whether the respective merchant is an active merchant based on the comparison;
   generating a set of weights for the set of active merchants based on census data indicating a respective percentage of the transactions performed by the set of merchants that originated from each industry in a set of industries, wherein generating a weight for a first active merchant from the set of active merchants comprises:
   determining an industry associated with the first active merchant;
   determining, based on the census data, a first percentage of the transactions performed by the set of merchants that originated from merchants in the industry associated with the first active merchant, wherein the first percentage of the transactions is determined based on at least one transaction that originated from the first active merchant and at least one transaction that originated from a second merchant that is different than the first active merchant;
   and determining the weight for the first active merchant based on the first percentage of transactions performed by the set of merchants that originated from merchants in the industry associated with the first active merchant; and
   generating a statistic based on the transaction data regarding transactions performed by the set of active merchants during the first period of time and the set of weights for the set of active merchants, wherein generating the statistic comprises:
   normalizing the transaction data regarding transactions performed by the set of active merchants during the first period of time based on the set of weights, yielding normalized transaction data; and
   generating the statistic based on the normalized transaction data regarding transactions performed by the set of active merchants during a subset of the first period of time.

2. The method of claim 1, wherein generating the set of weights for the set of active merchants is further based on data that indicates seasonality.

3. The method of claim 1, wherein identifying the set of active merchants includes refraining from selecting merchants that perform an anomalous number of transactions during the first period of time.

4. The method of claim 1, further comprising:
   generating an interface that depicts the statistic; and
   causing display of the interface on a client device.

5. The method of claim 1, further comprising:
   determining that the set of active merchants are active for a moment prior to the first period of time.

6. The method of claim 1, further comprising:
   determining that the set of active merchants remain active upon completion of the first period of time.

7. The method of claim 1, wherein the first period of time coincides with an occurrence of an event at a particular geographical location.

8. A system comprising:
   one or more computer processors; and
   one or more computer-readable mediums storing instructions that, when executed by the one or more computer processors, cause the system to perform operations comprising:
   receiving transaction data regarding transactions performed by a set of merchants, the transaction data indicating a number of transactions performed by each merchant in the set of merchants;
   identifying a set of active merchants from the set of merchants based on the transaction data, the set of active merchants being a subset of the set of merchants, wherein identifying the set of active merchants comprises:
  for each respective merchant from the set of merchants, determining, based on the transaction data, a number of transactions performed by the respective merchant during a first period of time;
  comparing the number of transactions performed by the respective merchant during the first period of time to a threshold number of transactions, yielding a comparison;
  determining whether the respective merchant is an active merchant based on the comparison;
generating a set of weights for the set of active merchants based on census data indicating a respective percentage of the transactions performed by the set of merchants that originated from each industry in a set of industries, wherein generating a weight for a first active merchant from the set of active merchants comprises:
  determining an industry associated with the first active merchant;
  determining, based on the census data, a first percentage of the transactions performed by the set of merchants that originated from merchants in the industry associated with the first active merchant, wherein the first percentage of the transactions is determined based on at least one transaction that originated from the first active merchant and at least one transaction that originated from a second merchant that is different than the first active merchant;
  and determining the weight for the first active merchant based on the first percentage of transactions performed by the set of merchants that originated from merchants in the industry associated with the first active merchant; and
generating a statistic based on the transaction data regarding transactions performed by the set of active merchants during the first period of time and the set of weights for the set of active merchants, wherein generating the statistic comprises:
  normalizing the transaction data regarding transactions performed by the set of active merchants during the first period of time based on the set of weights, yielding normalized transaction data; and
  generating the statistic based on the normalized transaction data regarding transactions performed by the set of active merchants during a subset of the first period of time.

9. The system of claim 8, wherein generating the set of weights for the set of active merchants is further based on data that indicates seasonality.

10. The system of claim 8, wherein identifying the set of active merchants includes refraining from selecting merchants that perform an anomalous number of transactions during the first period of time.

11. The system of claim 8, the operations further comprising:
  generating an interface that depicts the statistic; and
  causing display of the interface on a client device.

12. The system of claim 8, the operations further comprising:
  determining that the set of active merchants are active for a moment prior to the first period of time.

13. The system of claim 8, the operations further comprising:
  determining that the set of active merchants remain active upon completion of the first period of time.

14. The system of claim 8, wherein the first period of time coincides with an occurrence of an event at a particular geographical location.

15. A non-transitory computer-readable medium storing instructions that, when executed by one or more computer processors of one or more computing devices, cause the one or more computing devices to perform operations comprising:
  receiving transaction data regarding transactions performed by a set of merchants, the transaction data indicating a number of transactions performed by each merchant in the set of merchants;
  identifying a set of active merchants from the set of merchants based on the transaction data, the set of active merchants being a subset of the set of merchants, wherein identifying the set of active merchants comprises:
    for each respective merchant from the set of merchants, determining, based on the transaction data, a number of transactions performed by the respective merchant during a first period of time;
    comparing the number of transactions performed by the respective merchant during the first period of time to a threshold number of transactions, yielding a comparison;
    determining whether the respective merchant is an active merchant based on the comparison;
  generating a set of weights for the set of active merchants based on census data indicating a respective percentage of the transactions performed by the set of merchants that originated from each industry in a set of industries, wherein generating a weight for a first active merchant from the set of active merchants comprises:
    determining an industry associated with the first active merchant;
    determining, based on the census data, a first percentage of the transactions performed by the set of merchants that originated from merchants in the industry associated with the first active merchant, wherein the first percentage of the transactions is determined based on at least one transaction that originated from the first active merchant and at least one transaction that originated from a second merchant that is different than the first active merchant;
    and determining the weight for the first active merchant based on the first percentage of transactions performed by the set of merchants that originated from merchants in the industry associated with the first active merchant; and
  generating a statistic based on the transaction data regarding transactions performed by the set of active merchants during the first period of time and the set of weights for the set of active merchants, wherein generating the statistic comprises:
    normalizing the transaction data regarding transactions performed by the set of active merchants during the first period of time based on the set of weights, yielding normalized transaction data; and
    generating the statistic based on the normalized transaction data regarding transactions performed by the set of active merchants during a subset of the first period of time.

16. The non-transitory computer-readable medium of claim 15, wherein generating the set of weights for the set of active merchants is further based on data that indicates seasonality.

17. The non-transitory computer-readable medium of claim 15, wherein identifying the set of active merchants includes refraining from selecting merchants that perform an anomalous number of transactions during the first period of time.

* * * * *